(12) United States Patent
Parks

(10) Patent No.: US 10,678,070 B2
(45) Date of Patent: *Jun. 9, 2020

(54) METHOD AND PORTABLE AID FOR MINDFULNESS MEDITATION

(71) Applicant: Alan D. Parks, Lake Mary, FL (US)

(72) Inventor: Alan D. Parks, Lake Mary, FL (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/231,528

(22) Filed: Dec. 23, 2018

(65) Prior Publication Data

US 2019/0171040 A1  Jun. 6, 2019

Related U.S. Application Data

(63) Continuation of application No. 15/179,065, filed on Jun. 10, 2016, now Pat. No. 10,162,197.

(60) Provisional application No. 62/174,628, filed on Jun. 12, 2015.

(51) Int. Cl.
*G02C 7/16* (2006.01)
*G02C 7/10* (2006.01)

(52) U.S. Cl.
CPC ............... *G02C 7/16* (2013.01); *G02C 7/104* (2013.01); *G02C 7/105* (2013.01)

(58) Field of Classification Search
CPC ....... G02C 7/12; G02C 2202/20; G02C 7/107
USPC .............. 351/45, 46, 47, 48, 57, 58, 59, 158
See application file for complete search history.

(56) References Cited

U.S. PATENT DOCUMENTS

| | | |
|---|---|---|
| 1,515,389 A | 11/1924 | V |
| 2,796,610 A | 6/1957 | Dorrenbos |
| 3,470,870 A | 10/1969 | Nicolas |
| 3,628,854 A | 12/1971 | Arthur |
| 3,972,319 A | 8/1976 | Dehlinger |
| 4,858,609 A | 8/1989 | Cole |
| 4,859,047 A | 8/1989 | Badewitz |
| 4,902,274 A | 2/1990 | Gleeson |
| 4,915,495 A | 4/1990 | Takeuchi |
| 5,047,006 A | 9/1991 | Brandston et al. |
| 5,252,997 A | 10/1993 | Christenbery |
| 5,259,830 A | 11/1993 | Masuda |
| 5,447,528 A | 9/1995 | Gerardo |
| 5,503,637 A | 4/1996 | Kyricos et al. |
| 5,561,480 A | 10/1996 | Capes |
| 6,092,906 A | 7/2000 | Olmstead |
| 6,159,397 A | 12/2000 | Friedman |
| 6,235,046 B1 | 5/2001 | Gerdt |
| 6,267,721 B1 | 7/2001 | Welles |
| 6,431,719 B1 | 8/2002 | Lau et al. |
| 6,875,225 B1 | 4/2005 | Pederson et al. |
| 6,902,296 B2 | 6/2005 | Searfoss |
| 7,018,035 B1 | 3/2006 | Herold et al. |
| 7,188,945 B2 | 3/2007 | Grecco |
| 7,195,350 B2 | 3/2007 | Kurzrok |
| 8,968,176 B2 | 3/2015 | Altman et al. |

(Continued)

*Primary Examiner* — Hung X Dang
(74) *Attorney, Agent, or Firm* — Michael L. Leetzow P.A.

(57) ABSTRACT

An apparatus is provided to create a focal zone for mindfulness meditation. The apparatus includes a first member extending between a first edge and a second edge, the first member having a translucent portion, a first elongated side member attached adjacent the first edge of the first member, and a second elongated side member attached adjacent the second edge of the first member, the first and second elongated members being generally parallel to another and lying in a single horizontal plane.

19 Claims, 8 Drawing Sheets

(56) References Cited

U.S. PATENT DOCUMENTS 10,162,197 B2 * 12/2018 Parks ...................... G02C 7/16
2005/0157248 A1   7/2005 Heisman

* cited by examiner

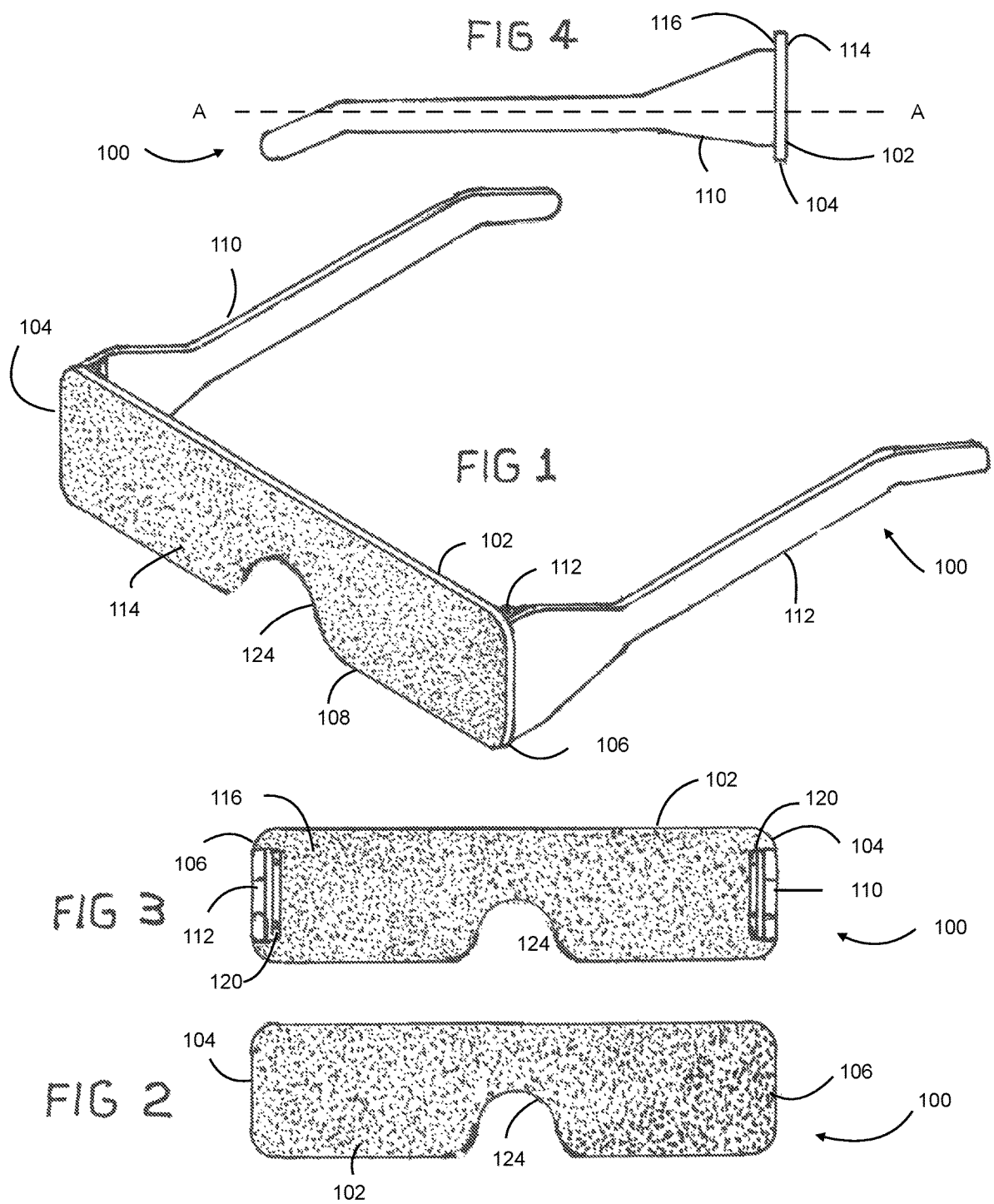

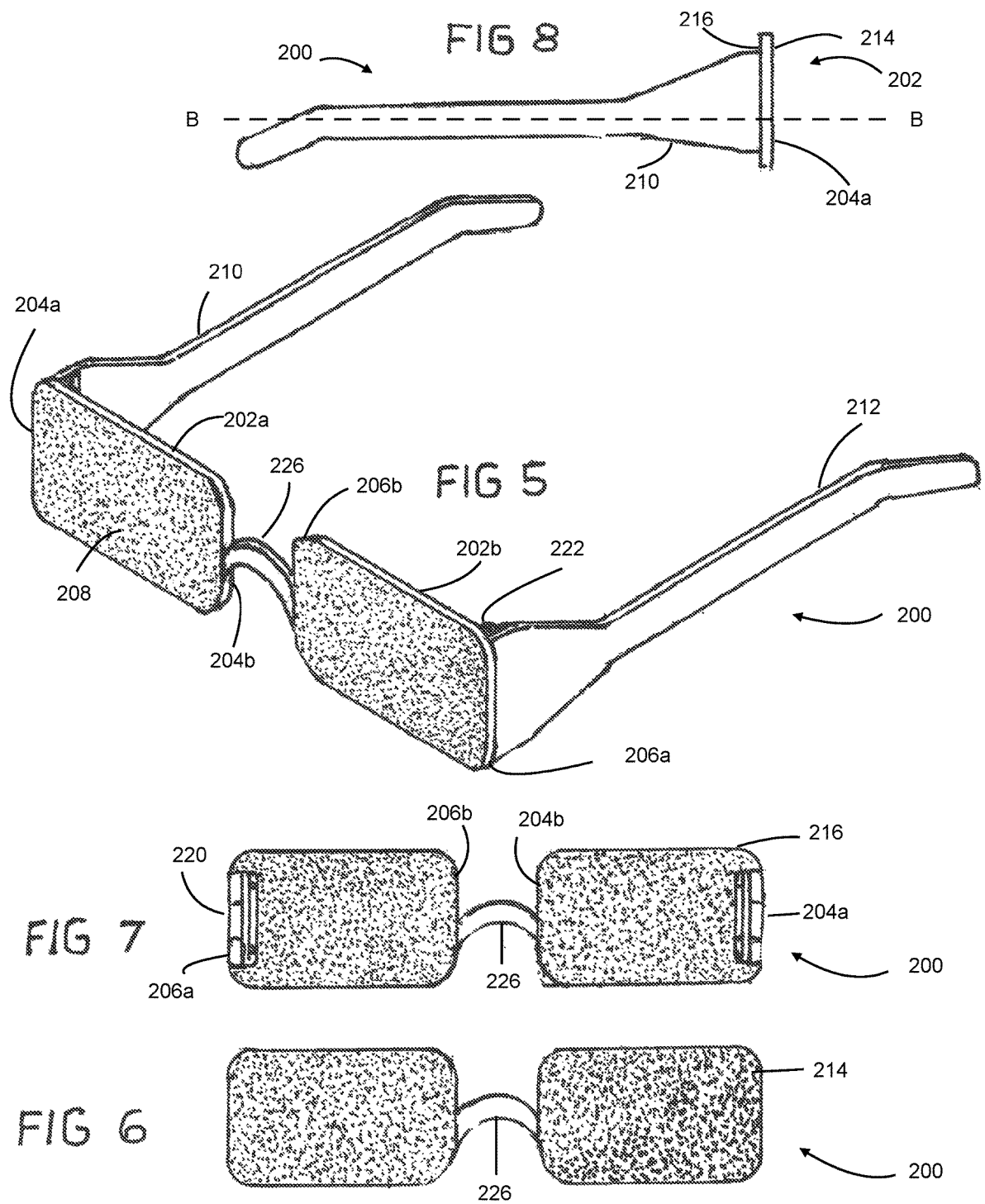

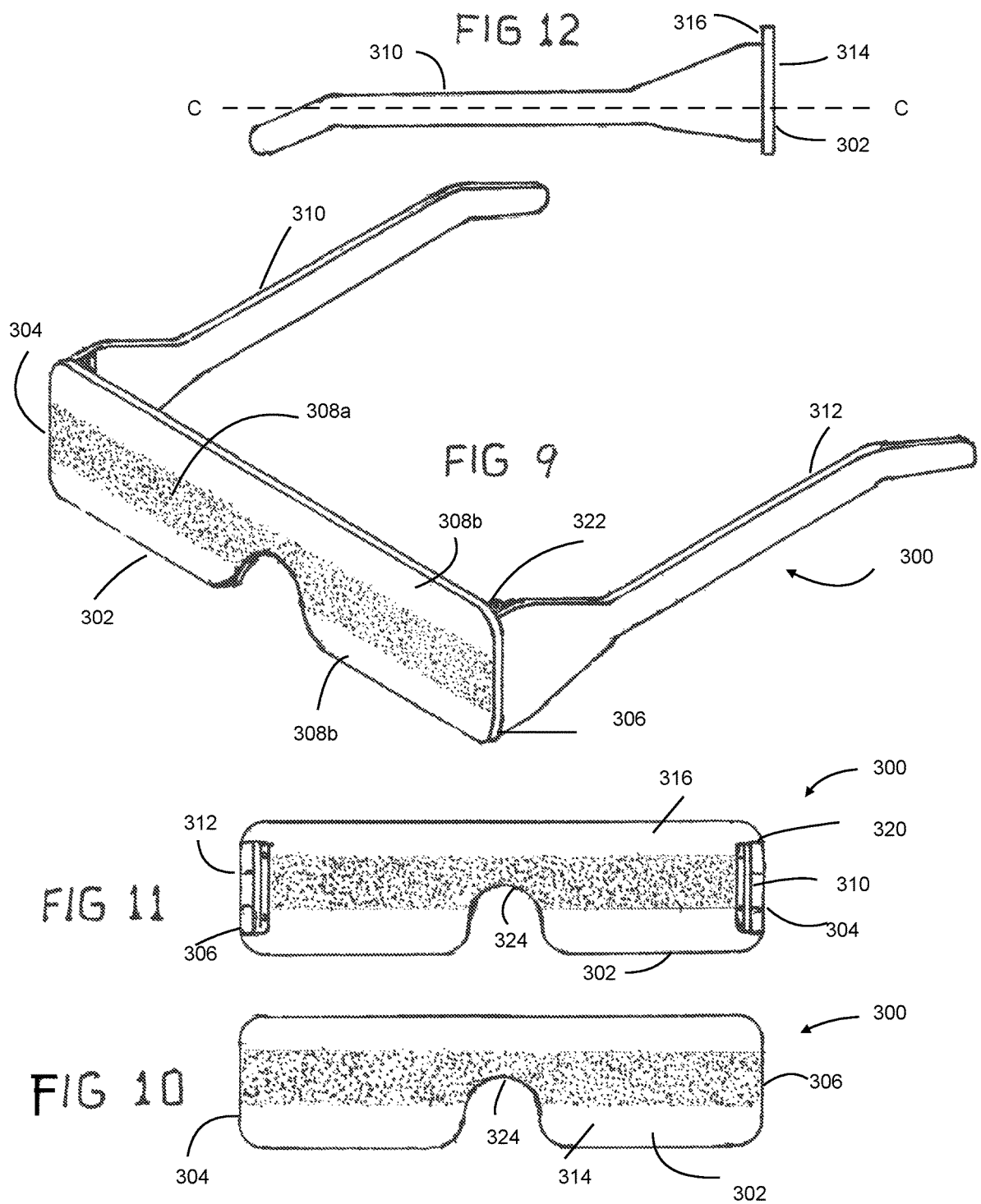

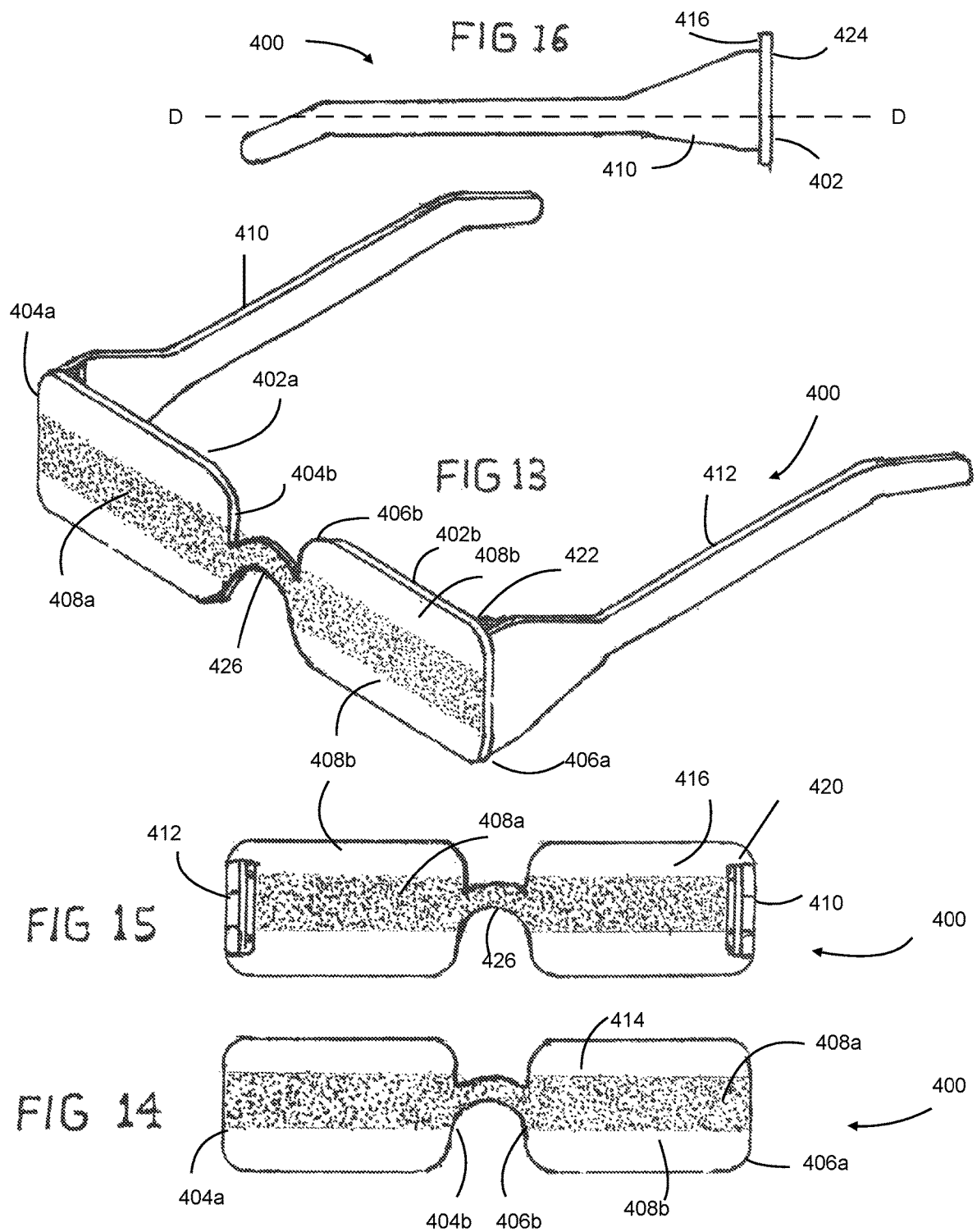

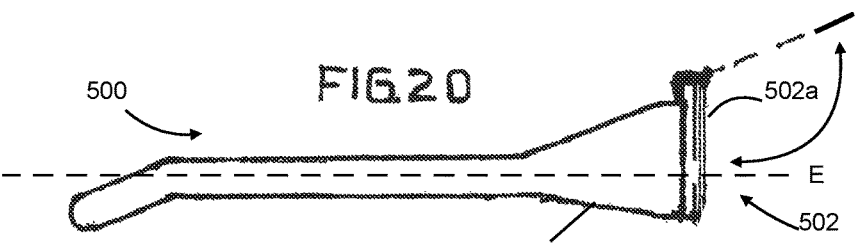
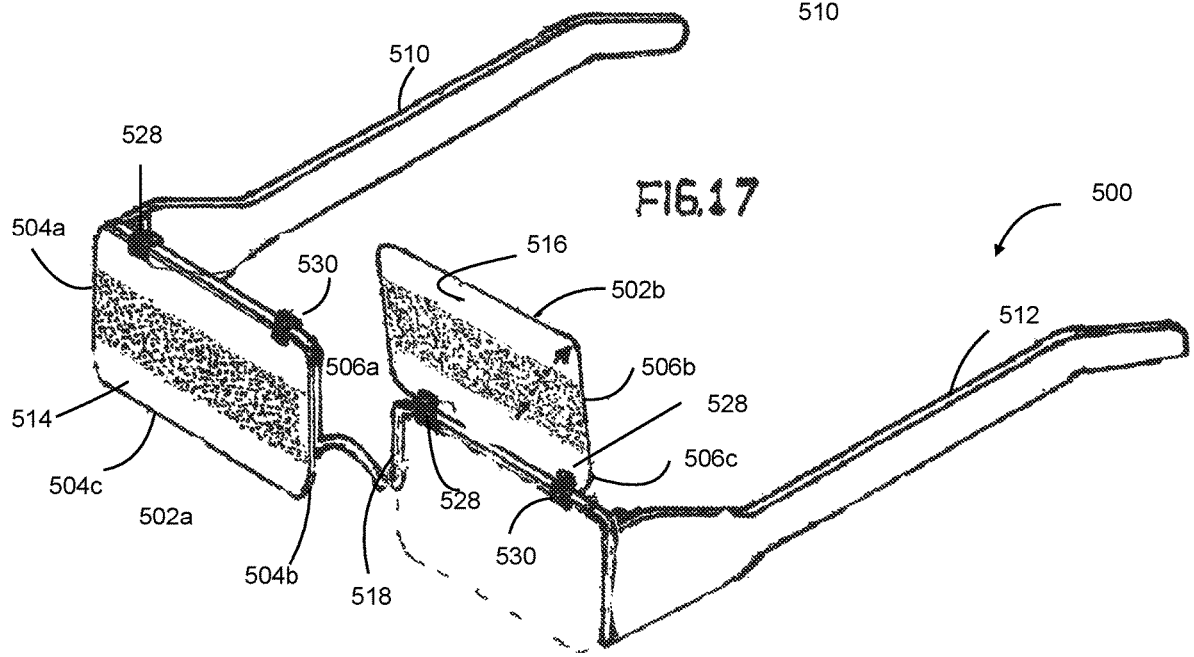
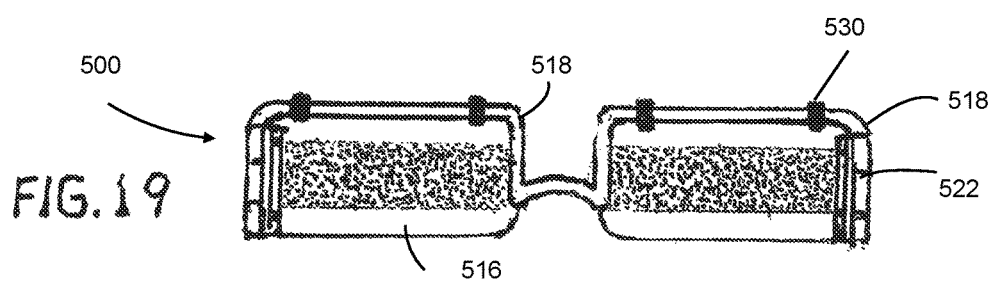
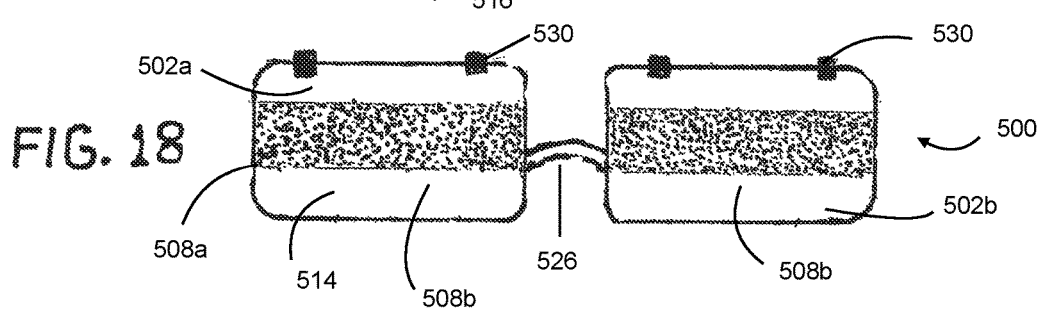

METHOD AND PORTABLE AID FOR MINDFULNESS MEDITATION

REFERENCE TO RELATED CASE

This application claims priority under 35 U.S.C. § 119 (e) to provisional application No. 62/174,628 filed on Jun. 12, 2015, and to U.S. patent application Ser. No. 15/179,065 under 35 U.S.C. Q 120, now U.S. Pat. No. 10,162,197, the contents of which are hereby incorporated by reference in their entirety.

BACKGROUND OF THE INVENTION

Field of the Invention

Public understanding and acceptance of Mindfulness Meditation has increased considerably in recent years. Its benefits are now recognized in a variety of areas including business, organized sports, public and private schools, colleges, hospitals. Examples include the Department of Veterans Affairs which recommends Mindfulness meditation as a therapeutic tool in treating PTSD, and the Mindfulness Based Cognitive Therapy (MBCT) movement, which has made strides in treating chronic depression by incorporating Mindfulness with cognitive therapy. Professional sports teams such as the Seattle Seahawks, the Chicago Bulls, and the L.A. Lakers have made Mindfulness a part of their core athlete training programs. School based programs like MindUP in the U.S., Canada, and the U.K. train teachers to teach and students to use Mindfulness to be less stressed, more focused and resilient.

"Mindfulness" is a deliberate, observational and non-judgmental approach to consciousness which cultivates moment-by-moment awareness of both thought and perception. The goal is a quiet, focused and undistracted mind. Those who practice it are often better able to understand themselves as well as more clearly perceive, understand, and react effectively with the present and the people in it.

"Mindfulness Meditation" comprises a number of systematic ways of maintaining and deepening the practice of Mindfulness. One of the more common and effective of these is simply sitting, with erect posture in a quiet setting, eyes open and directed forward toward a visually non-distracting background such as a screen or blank wall. Inner concentration on one's breathing is often recommended, especially for the inexperienced. The inner stream of thoughts is neither repressed nor intently examined, just calmly observed, and over time many of these thoughts and memories, even painful ones, can lose their power to distract from or color perception of the present.

This style of meditation has been practiced for many hundreds of years by adherents of Zen Buddhism as the shortest (but arguably also the most difficult) route to enlightenment. The eyes are kept open and unfocused to combat sleepiness and maintain a sense of the present moment and, where possible, facing a wall, curtain, or the like is recommended to prevent unwanted visual distractions. However, these conditions are not always possible, especially in group meditation or where unoccupied stretches of a wall, screen, or curtain are not available.

In U.S. Pat. No. 3,972,319: Wind Mosaic Glasses, a wearable meditative aid similar to eyeglasses is described wherein the outflowing breath of a user moves a small deflector surface under the nostrils which in turn rotates an outer, geometrical patterned lens relative to an inner and fixed lens having a differing pattern, to create a changing kaleidoscopic or moire' pattern. The user can thus monitor breathing while viewing entertaining geometrical patterns. Several significant drawback to using this device during mindfulness meditation are that it visually isolates the user from the user's actual visual environment, and its visual effects would distract the user from awareness of thoughts, which is perhaps the central tenet of mindfulness meditation.

U.S. Pat. No. 7,188,945: Eyeglass System Having Spinning Bezels, describes eyeglasses having rotatable, removable, and interchangeable circular bezels, which have a variety of geometric to increase the novelty and attractiveness of the glasses. Although the inventor mentions the possibility of other bezel designs having a calming or soothing effect during meditation, this device would have drawbacks similar to those of U.S. Pat. No. 3,972,319.

In U.S. Pat. No. 6,092,906: Personal/Private Light Screen, a largely opaque light screen worn like eyeglasses is presented having a self-contained light source configured to isolate the wearer from ambient light save for a pair of very small closable apertures allowing the wearer to read a closely positioned book or text if so desired. This device is similar to a larger class of such devices intended to counteract Seasonal Affect Disorder (SAD) using intense light sources. Again the drawback of such devices if used during mindfulness meditation is their tendency to overwhelm the ambient external and internal environment.

What is needed then is a portable meditative aid that can be worn in a manner similar to typical eyeglasses and would provide the wearer with a translucent visual region of limited size on which to focus during meditation without blocking the entire visual field.

SUMMARY OF THE INVENTION

The present invention is directed to an apparatus for at least partially blocking a field of view that includes a first member extending between a first edge and a second edge, the first member having a translucent portion, a first elongated side member attached adjacent the first edge of the first member, and a second elongated side member attached adjacent the second edge of the first member, the first and second elongated members being generally parallel to another and lying in a single horizontal plane.

In some embodiments, the first member is comprised of two smaller members, the two smaller members being joined by an arcuate portion adjacent edges thereof that are opposite to the edges attached to the elongated edges.

In some other embodiments, the first member has a transparent portion in addition to the translucent portion.

According to another aspect of the present invention, an apparatus for at least partially blocking a field of view includes a frame, a first member extending between a first edge and a second edge, the first member having a translucent portion and attached to the frame, a first elongated side member attached to the frame, and a second elongated side member attached to the frame, the first and second elongated members being generally parallel to another and lying in a single horizontal plane.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 1 is a perspective view of one embodiment of an apparatus for use in mindful meditation according to the present invention;

FIG. 2 is a front view of the apparatus of FIG. 1;

FIG. 3 is a rear view of the apparatus of FIG. 1;

FIG. 4 is a side view of the apparatus of FIG.1;

FIG. 5 is a perspective view of a second embodiment of an apparatus for use in mindful meditation according to the present invention;

FIG. 6 is a front view of the apparatus of FIG. 5;

FIG. 7 is a rear view of the apparatus of FIG. 5;

FIG. 8 is a side view of the apparatus of FIG. 5;

FIG. 9 is perspective view of a third embodiment of an apparatus for use in mindful meditation according to the present invention;

FIG. 10 is a front view of the apparatus of FIG. 9;

FIG. 11 is a rear view of the apparatus of FIG. 9;

FIG. 12 is a side view of the apparatus of FIG. 9;

FIG. 13 is a perspective view of a fourth embodiment of an apparatus for use in mindful meditation according to the present invention;

FIG. 14 is a front view of the apparatus of FIG.13;

FIG. 15 is a rear view of the apparatus of FIG. 13;

FIG. 16 is a side view of the apparatus of FIG. 13;

FIG. 17 is a perspective view of a fifth embodiment of an apparatus for use in mindful meditation according to the present invention.

FIG. 18 is a front view of the apparatus of FIG. 17;

FIG. 19 is a rear view of the apparatus of FIG. 17;

FIG. 20 is a side view of the apparatus of FIG. 17;

DETAILED DESCRIPTION OF THE PREFERRED EMBODIMENTS

Figure 21:
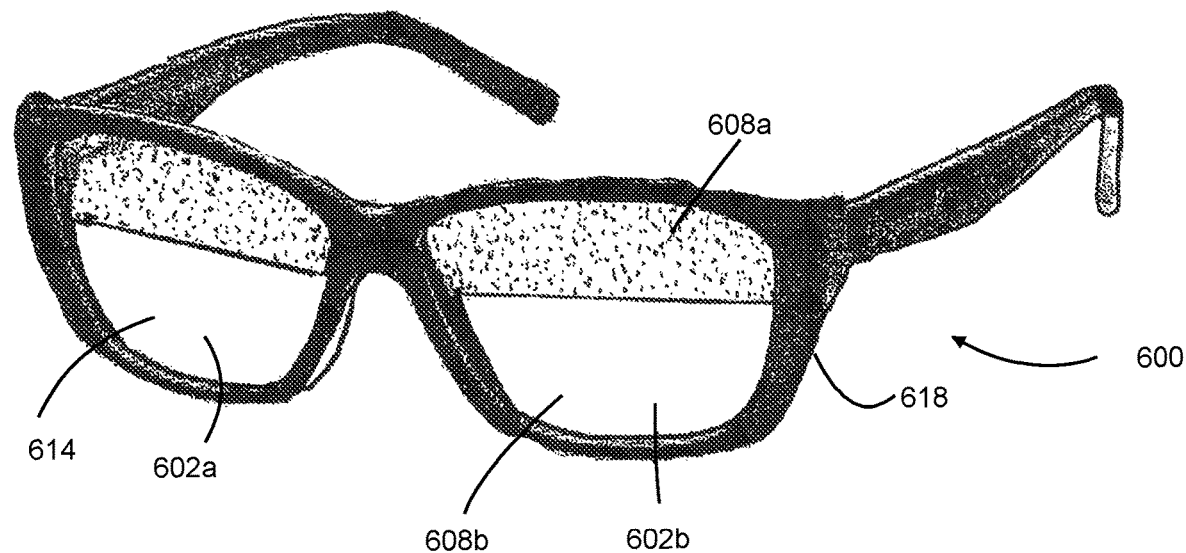
FIG. 21 is a front perspective view of a sixth embodiment of an apparatus for use in mindful meditation according to the present invention using typical eyeglass frames.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIGS. 1-4 is a first embodiment of an apparatus 100 for at least partially blocking a field of view. The apparatus 100 has a first member 102 extending between a first edge 104 and a second edge 106. The first member 102 has a translucent portion 108, which in FIGS. 1-4 cover the entirety of the first member 102. However, as described below in more detail, the translucent portion 108 may only cover a portion of the first member 102. The apparatus 100 also has a first elongated side member 110 attached adjacent the first edge 104 of the first member 102. The apparatus 100 also has a second elongated side member 112 attached adjacent the second edge 106 of the first member 102. The two elongated side members 110,112 extend rearwardly from the first member 102 and they are generally parallel to another and lying in a single horizontal plane A. See FIG. 4. The first member 102 has an outside surface 114 and an opposing, inside surface 116. On the inside surface 116 are attachments 120 adjacent the first edge 104 and the second edge 106 for the two elongated side members 110,112. The attachments 120 preferably include pins or screws 122 to allow for the two elongated side members 110,112 to be attached to the first member 102 in a rotatable manner. However, the elongated side members 110,112 could be fixedly attached to the attachments 120 or even fixedly attached directly to the first member 102.

The first member 102 also includes a rounded bottom edge portion 124, the rounded bottom edge portion 124 could be viewed as a cut-out portion of first member 102 that is configured to engage a bridge of a nose (not illustrated) of a user of the apparatus 100. As will be clear to a user of the apparatus 100, the apparatus 100 generally looks and operates like a pair of glasses in that the two elongated side members 110,112 correspond to the temples and the first member 102 as the front (frame and lenses) of the eye glasses.

The translucent portion 108 can be formed on either the outside surface 114 or on the opposing, inside surface 116. The translucent portion 108 (and those described below) can be formed in a number of ways. For example, the translucent portion 108 can be made by adhering a film to the first member 102, either on the outside surface 114 or on the inside surface 116. The film can be glued to the surfaces or by static cling. Alternatively, the translucent portion 108 can be made either mechanically (for example, by grinding one of the surfaces of the first member 102) or chemically (for example by etching the first member 102).

A second embodiment of an apparatus 200 for at least partially blocking a field of view is illustrated in FIGS. 5-8. The apparatus 200 has a first member 202 that includes two smaller members, a first smaller member 202a and a second smaller member 202b. The first smaller member 202a has an outside edge 204a and an inside edge 204b. The second smaller member 202b has an outside edge 206a and an inside edge 206b.

The first smaller member 202a and the second smaller member 202b each have a translucent portion 208, which in FIGS. 5-8 cover the entirety of the first smaller member 202a and the second smaller member 202b. However, as described below in more detail, the translucent portion 208 may only cover a portion of the first smaller member 202a and the second smaller member 202b.

The apparatus 200 also has a first elongated side member 210 attached adjacent the outside edge 204a of the first smaller member 202a. The apparatus 200 also has a second elongated side member 212 attached adjacent the outside edge 206a of the second smaller member 202b. The two elongated side members 210,212 extending rearwardly from the first smaller member 202a and the second smaller member 202b and they are generally parallel to another and lying in a single horizontal plane B. See FIG. 8. The elongated side members 210,212 could have any shape or configuration, not just the shape illustrated in the figures.

The two smaller members 202a and 202b are joined by an arcuate portion 226 that connects to the inside edge 204b of the first smaller member 202a and the inside edge 206b of second smaller member 202b. The arcuate portion 226 has a rounded bottom edge portion that is configured to engage a bridge of a nose (not illustrated) of a user of the apparatus 200. The arcuate portion 226 may be a separate piece (even made from a different material) or a continuation of (and thus integral with) the two smaller members 202*a* and 202*b*.

The first smaller member 202*a* and a second smaller member 202*b* both have an outside surface 214 and an opposing, inside surface 216. On the inside surface 216 are attachments 220 adjacent the outside edge 204*a* and the outside edge 206*a* for the two elongated side members 210,212. The attachments 220 preferably include pins or screws 222 to allow for the two elongated side members 210,212 to be attached to the first member 102 in a rotatable manner. However, the elongated side members 210,212 could be fixedly attached to the attachments 220 or even fixedly attached directly to the two smaller members 202*a* and 202*b*.

A third embodiment of an apparatus 300 for at least partially blocking a field of view is illustrated in FIGS. 9-12. The apparatus 300 has a first member 302 extending between a first edge 304 and a second edge 306. The first member 302 has a translucent portion 308*a* and two transparent portions 308*b*, one on either side of the translucent portions 308*a*. In this configuration, the person using the apparatus 300 may focus on the translucent portion 308*a* during meditation, and use the transparent portions 308*b* before and/or after meditating. The transparent portions 308*b* may also have an optical prescription if so desired. The translucent portion 308*a* covers about 40 percent of the first member 302, but may cover anywhere from 20 to 70 percent. Additionally, while the translucent portions 308*a* appear to be of similar size and areas, they may be of different sizes and areas, meaning that the translucent portion 308*a* would be disposed farther up or down on the first member 302.

The apparatus 300 also has a first elongated side member 310 attached adjacent the first edge 304 of the first member 302. The apparatus 300 also has a second elongated side member 312 attached adjacent the second edge 306 of the first member 302. The two elongated side members 310,312 extend rearwardly from the first member 302 and they are generally parallel to another and lying in a single horizontal plane C. See FIG. 12. The elongated side members 310,312 could have any shape or configuration, not just the shape illustrated in the figures.

The first member 302 has an outside surface 314 and an opposing, inside surface 316. On the inside surface 316 are attachments 320 adjacent the first edge 304 and the second edge 306 for the two elongated side members 310,112. The attachments 320 preferably include pins or screws 322 to allow for the two elongated side members 310,312 to be attached to the first member 302 in a rotatable manner. However, the elongated side members 310,312 could be fixedly attached to the attachments 320 or even fixedly attached directly to the first member 302.

The first member 302 also includes a rounded bottom edge portion 324, the rounded bottom edge portion 324 could be viewed as a cut-out portion of first member 302 that is configured to engage a bridge of a nose (not illustrated) of a user of the apparatus 300. As will be clear to a user of the apparatus 300, the apparatus 300 generally looks and operates like a pair of glasses in that the two elongated side members 310,312 correspond to the temples and the first member 302 as the front (frame and lenses) of the eye glasses.

FIGS. 13-16 illustrates a fourth embodiment of an apparatus 400 for at least partially blocking a field of view. The apparatus 400 has a first member 402 that includes two smaller members, a first smaller member 402*a* and a second smaller member 402*b*. The first smaller member 402*a* has an outside edge 404*a* and an inside edge 404*b*. The second smaller member 402*b* has an outside edge 406*a* and an inside edge 406*b*.

Each of the first smaller member 402*a* and a second smaller member 402*b* have translucent portion 408*a* and two transparent portions 408*b*, one on either side of the translucent portions 408*a*. In this configuration, the person using the apparatus 400 may focus on the translucent portion 408*a* during meditation, and use the transparent portions 408*b* before and/or after meditating. The transparent portions 408*b* may also have an optical prescription if so desired. The translucent portion 408*a* covers about 40 percent of the first member 302, but may cover anywhere from 20 to 70 percent. Additionally, while the translucent portions 408*a* appear to be of similar size and areas, they may be of different sizes and areas, meaning that the translucent portion 408*a* would move up or down on the first member 402.

The apparatus 400 also has a first elongated side member 410 attached adjacent the outside edge 404*a* of the first smaller member 402*a*. The apparatus 400 also has a second elongated side member 412 attached adjacent the outside edge 406*a* of the second smaller member 402*b*. The two elongated side members 410,412 extending rearwardly from the first smaller member 202*a* and the second smaller member 402*b* and they are generally parallel to another and lying in a single horizontal plane D. See FIG. 16. The elongated side members 410,412 could have any shape or configuration, not just the shape illustrated in the figures.

The two smaller members 402*a* and 402*b* are joined by an arcuate portion 426 that connects to the inside edge 404*b* of the first smaller member 402*a* and the inside edge 406*b* of second smaller member 402*b*. The arcuate portion 426 has a rounded bottom edge portion that is configured to engage a bridge of a nose (not illustrated) of a user of the apparatus 400. The arcuate portion 426 may be a separate piece (even made from a different material) or a continuation (and thus integral) of the two smaller members 402*a* and 402*b*. As illustrated, the arcuate portion 426 may also have a translucent portion or be transparent.

The first smaller member 402*a* and a second smaller member 402*b* both have an outside surface 414 and an opposing, inside surface 416. On the inside surface 416 are attachments 420 adjacent the outside edge 404*a* and the outside edge 406*a* for the two elongated side members 410,412. The attachments 420 preferably include pins or screws 422 to allow for the two elongated side members 410,412 to be attached to the first member 402 in a rotatable manner. However, the elongated side members 410,412 could be fixedly attached to the attachments 420 or even fixedly attached directly to the two smaller members 402*a* and 402*b*.

Another embodiment of an apparatus 500 for at least partially blocking a field of view is illustrated in FIGS. 17-20. The apparatus 500 has a first member 502 that includes two smaller members, a first smaller member 502*a* and a second smaller member 502*b*. The first smaller member 502*a* has an outside edge 504*a*, an inside edge 504*b*, and a top edge 504*c*. The second smaller member 502*b* has an outside edge 506*a*, an inside edge 506*b*, and a top edge 506*c*.

The first smaller member 502*a* and the second smaller member 502*b* each have a translucent portion 508, which as illustrated in FIGS. 17-19 cover a portion of the first smaller member 502*a* and the second smaller member 502*b*. However, the translucent portion 508 may cover the entire surface of the first smaller member 502a and the second smaller member 502b.

The apparatus 500 has a frame 518 to which the first smaller member 502a and the second smaller member 502b are attached. The first smaller member 502a and the second smaller member 502b are rotatably attached to the frame 518 at the top edge 504c and top edge 506c, respectively. The first smaller member 502a and the second smaller member 502b have two openings 528 adjacent the top edge 504c, 506c to allow a clip or other piece 530 to pass through the openings 528 and around a portion of the frame 518. Preferably, the clip 530 will be chosen to allow the first smaller member 502a and the second smaller member 502b to remain either in an up position, such as illustrated in FIG. 17 by second smaller member 502b. The first smaller member 502a and a second smaller member 502b both have an outside surface 514 and an opposing, inside surface 516. The translucent portion 508 may be disposed or formed on either the outside surface 514 or the inside surface 516.

The apparatus 500 also has a first elongated side member 510 attached to the frame 518 adjacent the outside edge 504a of the first smaller member 502a (when the first smaller member 502a is in a down position). The apparatus 500 also has a second elongated side member 512 attached to the frame 518 adjacent the outside edge 506a of the second smaller member 502b when it is in the down position. The two elongated side members 510,512 extending rearwardly from the frame 518 and they are generally parallel to another and lying in a single horizontal plane E. See FIG. 20. The elongated side members 510,512 could have any shape or configuration, not just the shape illustrated in the figures.

The frame 518 includes an arcuate portion 526 that connects the two frame portions supporting the first smaller member 502a and the second smaller member 502b. The arcuate portion 526 has a rounded bottom edge portion that is configured to engage a bridge of a nose (not illustrated) of a user of the apparatus 500.

The frame 518 may also include attachments 520 for the two elongated side members 510,512. The attachments 520 preferably include pins or screws 522 to allow for the two elongated side members 510,512 to be attached to the frame 518 in a rotatable manner. However, the elongated side members 510,512 could be fixedly attached to the frame 518.

Figure 22:
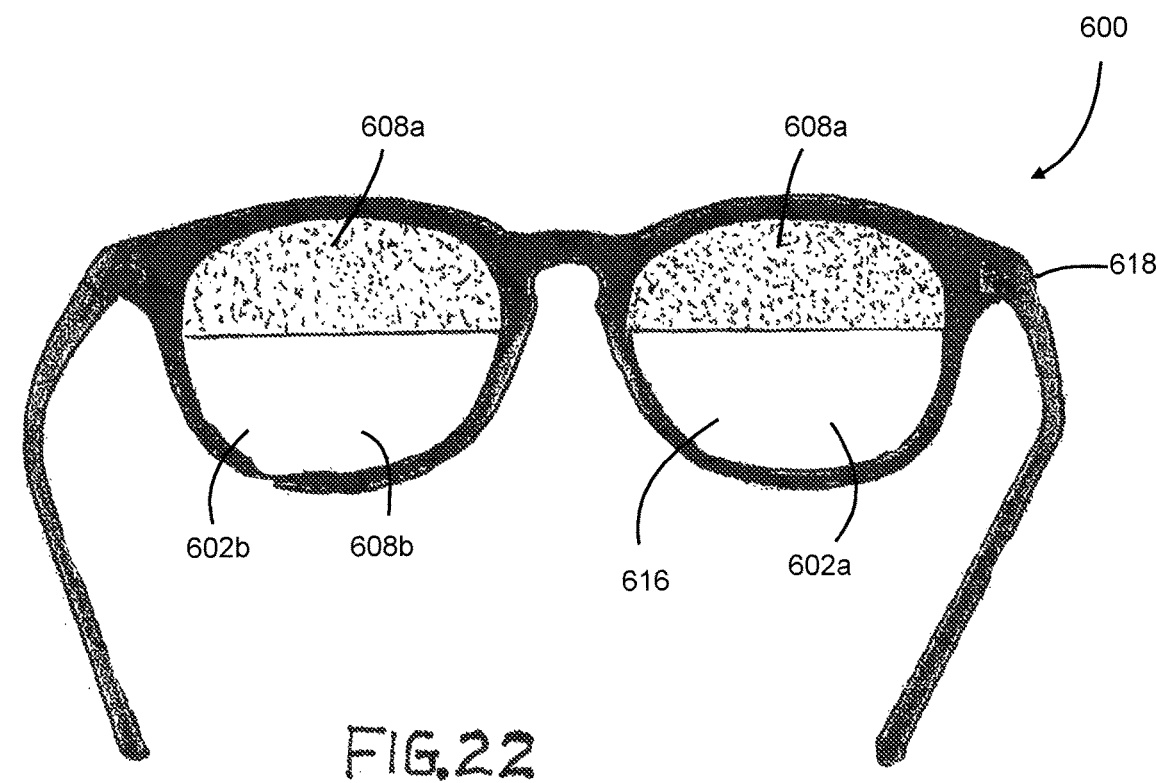
FIG. 22 is a rear perspective view of the apparatus of FIG. 21.

A sixth embodiment of an apparatus 600 for at least partially blocking a field of view is illustrated in FIGS. 21-22. In this embodiment, a frame 618 of a pair of glasses has a first smaller member 602a and the second smaller member 602b. The first smaller member 602a and the second smaller member 602b each have a translucent portion 608a, which as illustrated cover a top portion of the first smaller member 602a and the second smaller member 602b. The translucent portion 608a may also be present on the lower portion (reversed with the transparent portion 608b) or cover the entire surface of the first smaller member 502a and the second smaller member 502b and come within the scope of the present invention. The first smaller member 602a and a second smaller member 602b both have an outside surface 614 and an opposing, inside surface 616. The translucent portion 608a may be disposed or formed on either the outside surface 614 or the inside surface 616.

Figure 23:
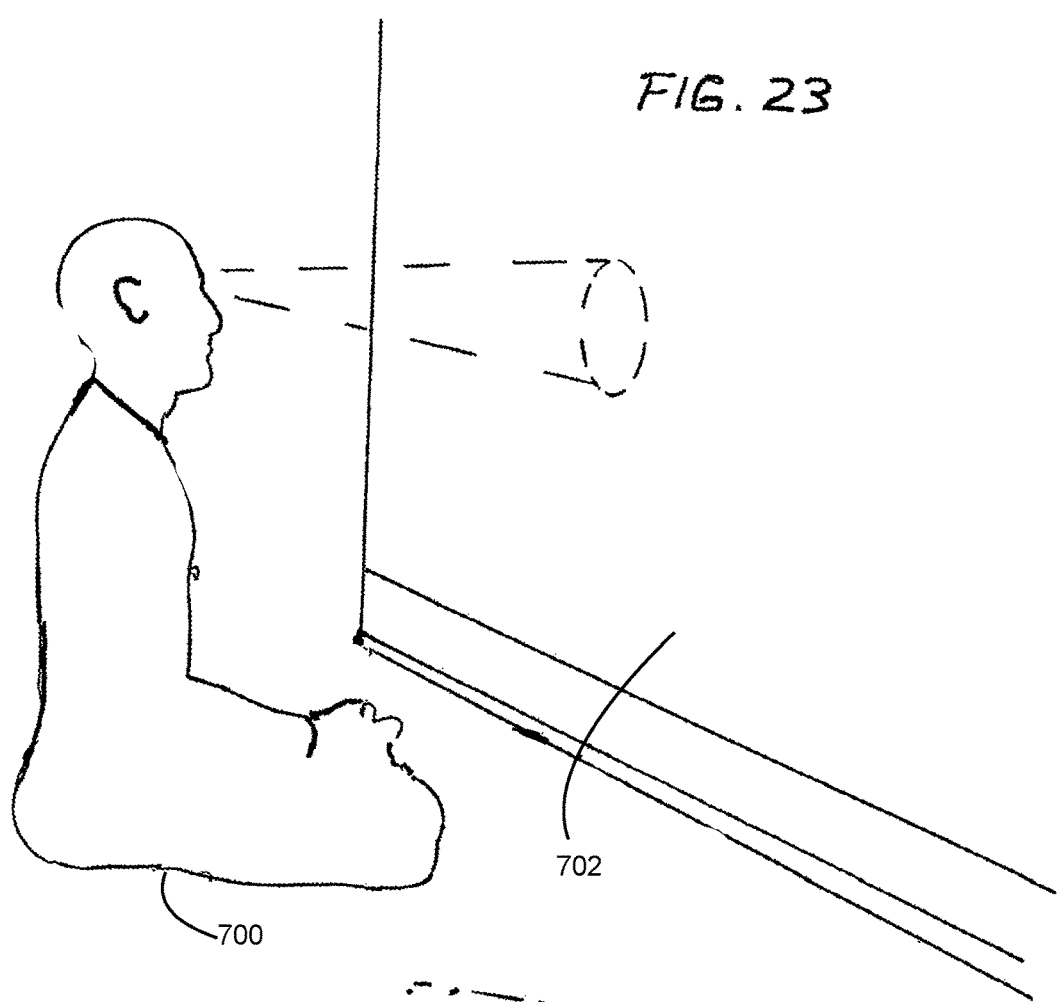
FIG. 23 is a depiction of sitting mindfulness meditation using a wall as a focal zone.
Figure 24:
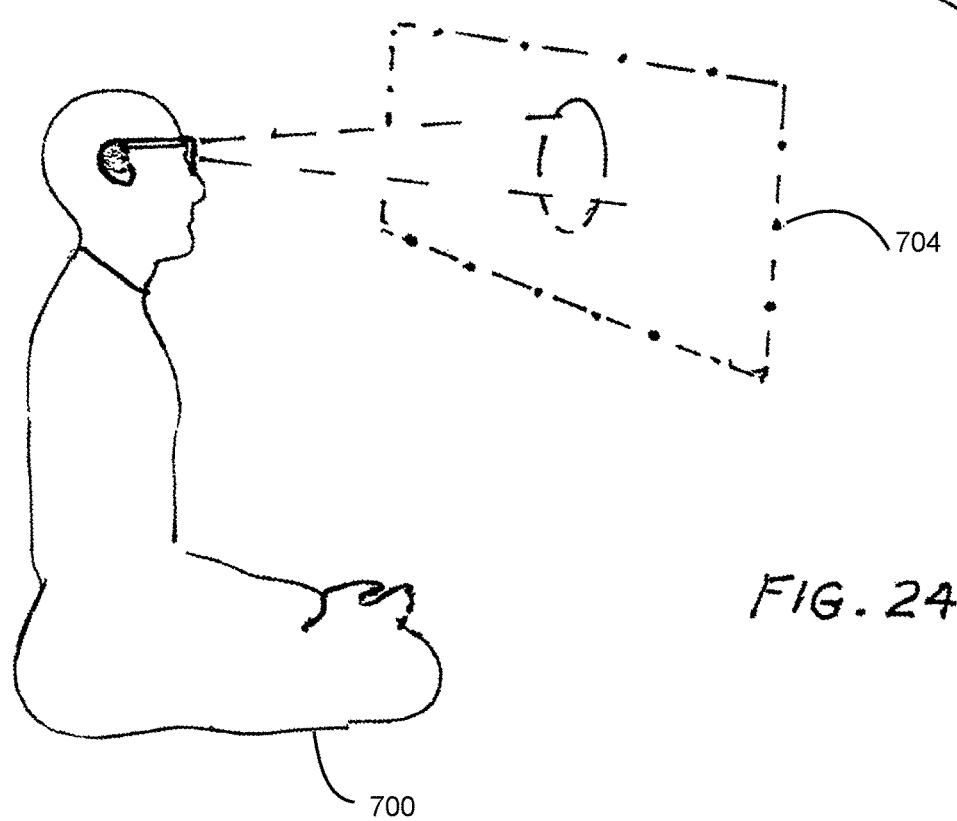
FIG. 24 depicts sitting meditation using the one embodiment of an apparatus for use in mindful meditation according to the present invention to create a focal zone.
Figure 25:
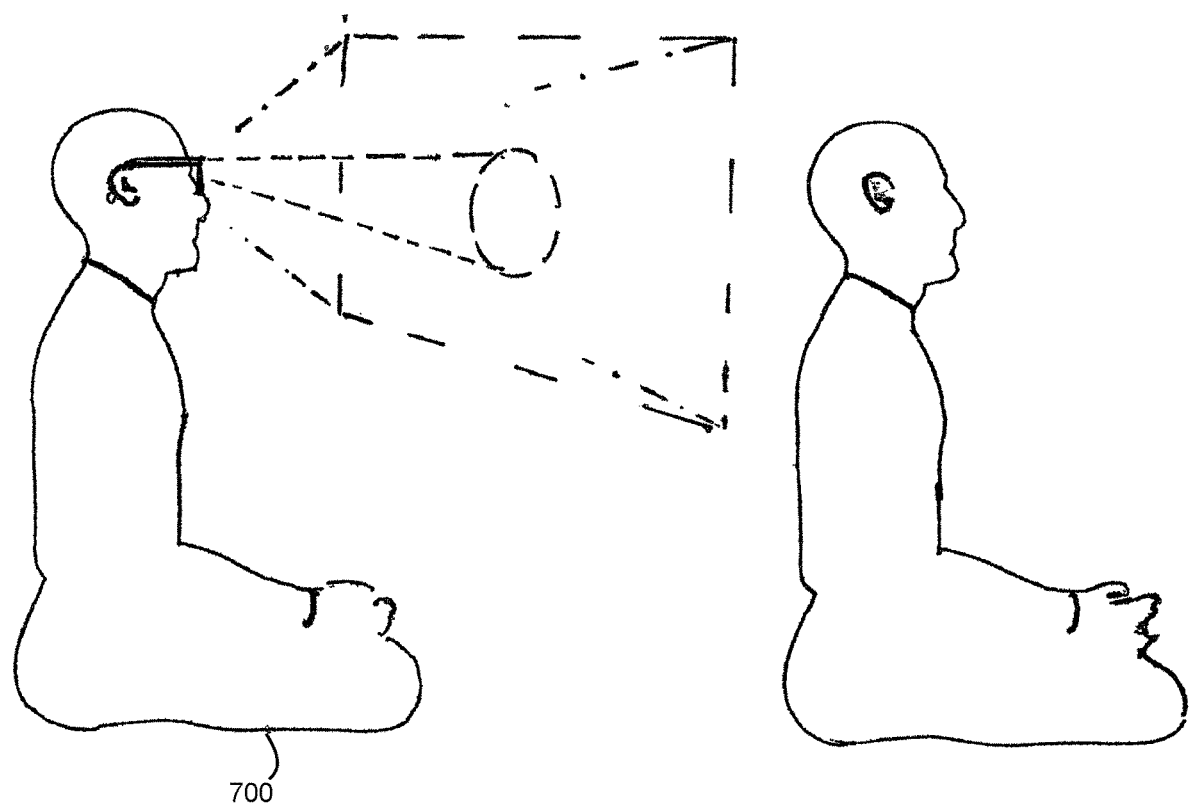
FIG. 25 depicts group sitting meditation using the one embodiment of an apparatus for use in mindful meditation according to the present invention to create a focal zone

The use of the apparatus according to the present invention will now be explained with reference to FIGS. 23-35. In FIG. 23, a person 700 is illustrated focusing on a wall during mindfulness meditation using a wall 702 as a focal zone. However, such a focal zone is not always possible or available to those wanting to engage in mindfulness meditation. Thus, the person 700 is depicted in FIG. 24 as using one embodiment of the apparatus according to the present invention to create a focal zone 704 without the need to have a blank wall or other appropriate location. As a result, the person 700 can really create a focal zone where ever they may be. And FIG. 25 illustrates the use of the apparatus according to the present invention by person 700 in a group setting.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. An apparatus for at least partially blocking a field of view comprising:
   a first member extending between a first edge and a second edge, the first member having a translucent portion extending substantially from the first edge to the second edge and substantially from a top edge to a bottom edge to at least partially block the field of view of a user;
   a first elongated side member attached adjacent the first edge of the first member; and
   a second elongated side member attached adjacent the second edge of the first member, the first and second elongated members being generally parallel to another and lying in a single horizontal plane.

2. The apparatus according to claim 1, wherein the first and second elongated side members are rotatably attached to the first member.

3. The apparatus according to claim 1, wherein the first member is comprised of two smaller members, the two smaller members being joined by an arcuate portion adjacent edges thereof that are opposite to the edges attached to the elongated edges.

4. The apparatus according to claim 1, wherein the first member has rounded bottom edge portion, the rounded bottom edge portion configured to engage a bridge of a nose.

5. The apparatus according to claim 1, wherein the first member has a transparent portion in addition to the translucent portion.

6. The apparatus according to claim 1, wherein the translucent portion is positioned between two transparent portions.

7. The apparatus according to claim 1, wherein the translucent portion covers at least 40% of the first member.

8. The apparatus according to claim 1, wherein the first member has an inside surface and an outside surface, one of the inside and the outside surfaces having a surface treatment to make the first member translucent.

9. The apparatus according to claim 8, wherein the surface treatment includes a material adhered to the first member.

10. The apparatus according to claim 8, wherein the surface treatment includes a physical or chemical treatment to the first member.

11. An apparatus for at least partially blocking a field of view comprising:
    a frame;
    a first member extending between a first edge and a second edge, the first member having a translucent portion extending substantially from the first edge to the second edge and substantially from a top edge to a bottom edge to at least partially block the field of view of a user and attached to the frame;

a first elongated side member attached to the frame; and a second elongated side member attached to the frame, the first and second elongated members being generally parallel to another and lying in a single horizontal plane.

12. The apparatus according to claim 11, wherein the first member is comprised of two smaller members, each of the two smaller members being rotatably connected to the frame.

13. The apparatus according to claim 11, wherein the first member is comprised of two smaller members are completely surrounded by a portion of the frame.

14. The apparatus according to claim 11, wherein the first member has an inside surface and an outside surface, one of the inside and the outside surfaces having a surface treatment to make the first member translucent.

15. The apparatus according to claim 14, wherein the surface treatment includes a material adhered to the first member.

16. The apparatus according to claim 14, wherein the surface treatment includes a physical or chemical treatment to the first member.

17. An apparatus for at least partially blocking a field of view comprising:

a first member extending between a first edge and a second edge, the first member having a translucent portion extending substantially between the first and second edges to at least partially block the field of view of a user and is positioned between two transparent portions;

a first elongated side member attached adjacent the first edge of the first member; and a second elongated side member attached adjacent the second edge of the first member, the first and second elongated members being generally parallel to another and lying in a single horizontal plane.

18. The apparatus according to claim 17, wherein the translucent portion covers at least 40% of the first member.

19. The apparatus according to claim 17, wherein the first member is comprised of two smaller members, each of the two smaller members being rotatably connected to the frame.

* * * * *